Figure 1:
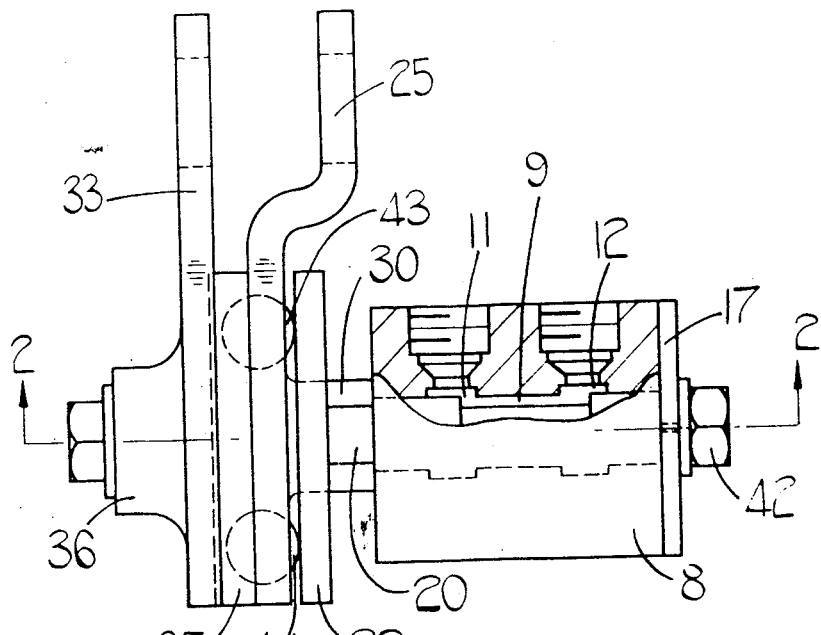

United States Patent
Lee

[11] 3,776,271
[45] Dec. 4, 1973

[54] FLUID CONTROL VALVE

[76] Inventor: Alwyne Lee, 47 Bushby's Ln., Formby, England

[22] Filed: June 27, 1972

[21] Appl. No.: 266,557

Related U.S. Application Data

[62] Division of Ser. No. 122,479, March 9, 1971, Pat. No. 3,685,286.

[30] Foreign Application Priority Data
Oct. 20, 1970 Great Britain.................. 50,155/70

[52] U.S. Cl................................. 137/595, 251/255
[51] Int. Cl......................................... F16k 31/524
[58] Field of Search ....251/251–256; 137/637.1, 595

[56] References Cited
UNITED STATES PATENTS
710,945  10/1902  Bunting............................. 251/253
2,566,860  9/1951  Segal............................. 251/255 X FOREIGN PATENTS OR APPLICATIONS
754,429  8/1953  Germany........................... 251/253

Primary Examiner—Martin P. Schwadron
Assistant Examiner—Richard Gerard
Attorney—J. Webster Paxton

[57] ABSTRACT

A fluid control valve has a pair of spool closure members which are slidable in unison to control flow between associated pairs of ports in response to relative movement between a pair of control elements on the valve. The said relative movement causes axial displacement of actuators which engage an abutment secured to the spools, the abutment being biased into contact with the actuators.

8 Claims, 6 Drawing Figures

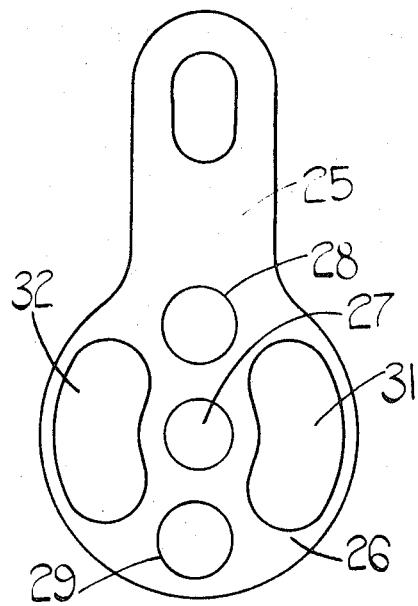
FIG.3.
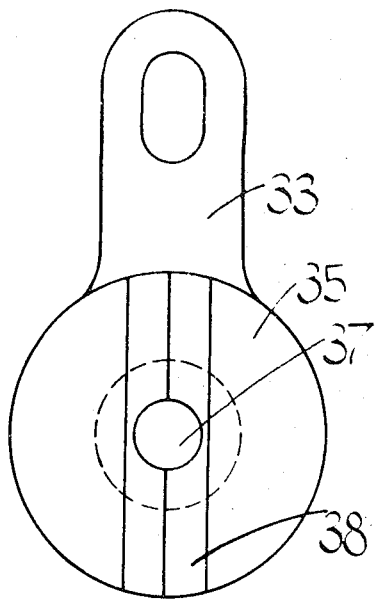
FIG.4.
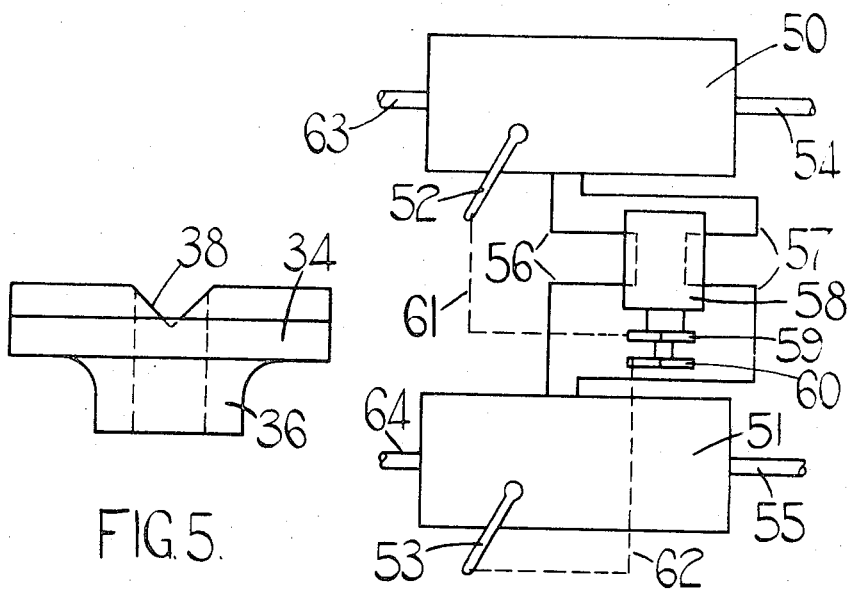
FIG.5.
FIG.6.

FLUID CONTROL VALVE

This is a continuation, divisional, of application Serial No. 122,479, filed Mar. 9, 1971, and now U.S. Pat. No. 3,685,286.

This invention relates to valves for controlling the flow of fluids and has as an object to provide such a valve in a convenient form.

A valve according to the invention includes a body having a pair of ports and a passage therebetween, a closure member movably mounted in the body, a pair of valve operating elements mounted on the body and capable of movement relative to one another, actuating means located with respect to one of the said elements and engageable with a co-operating means on the other of the elements and biasing means urging the closure member towards the actuating means, the said actuating means co-acting with the closure so that when the operating elements are in a predetermined position relative to each other the closure member is in a first position relative to the ports, irrespective of the position of the operating elements relative to the body, but in all other positions of the operating elements relative to each other the closure member is in a second position relative to the ports.

A preferred form of the valve has two pairs of ports, two passages respectively interconnecting the ports of the respective pairs and a pair of closure members respectively associated with the pairs of ports.

There may thus be provided a hydrostatic transmission system comprising a pair of pump and motor units each of which includes a means for controlling the output speeds of the respective motors, a passage interconnecting the high pressure ports of the units, a passage interconnecting the low pressure ports of the units and a valve of the preferred form in the said interconnecting passage, the operating elements of the valve being coupled to the speed control means respectively, the arrangement being such that the closure memebers remain open when the control means are moved in unison and are shut when a control means is moved so as to vary the output speed of one of the units with respect to the other.

Figure 2:
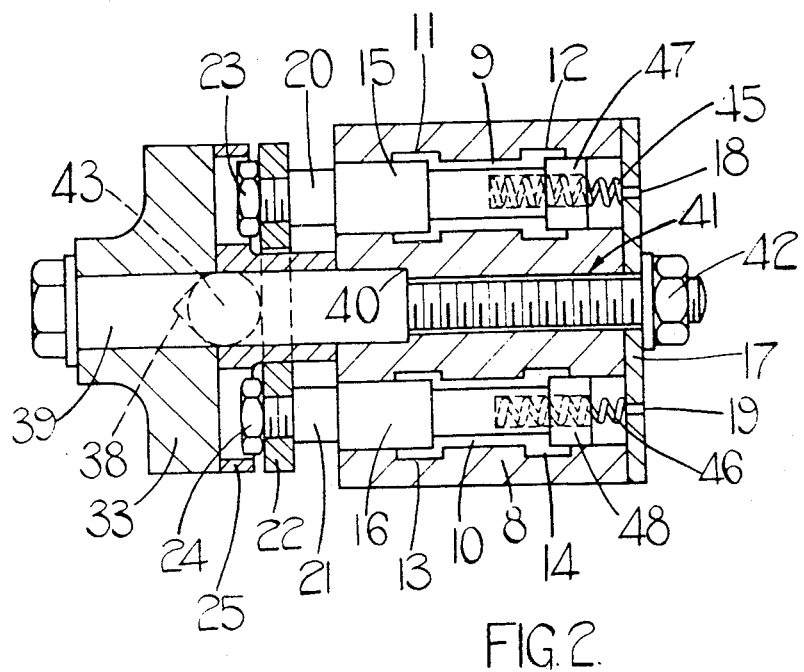

A valve according to the invention will now be described by way of example and with reference to the accompanying drawings, in which:

FIG. 1 is a part section of a valve,
FIG. 2 is a section on line 2—2 in FIG. 1,
FIGS. 3 and 4 are details of parts of the valve shown in FIG. 1,
FIG. 5 is an end view of FIG. 4, and
FIG. 6 shows diagrammatically a hydrostatic transmission system incorporating a valve as shown in FIGS. 1 and 2.

The valve comprises a body 8 in which there are two passages 9, 10. A pair of ports 11,12 opens into the passage 9 and another pair of ports 13, 14 similarly opens into the passage 10. Spool closure members 15, 16 are slidable in the respective passages 9, 10. A cover plate 17 has two drain holes 18, 19 respectively axially aligned with the passages 9,10. Extending from the closure members 15, 16 are shouldered studs 20, 21 which support a plate 22. The plate 22 is secured by nuts 23, 24 respectively engaging the studs 20, 21.

A first valve operating element 25 in the form of a cranked lever has an enlarged portion 26 at one end thereof in which are three holes 27, 28, 29 with their centres aligned. A spigot 30, integral with the portion 26 and axially aligned with the hole 27 passes through a central hole in the plate 22 and engages the body 8. Also within the portion 26 are a pair of kidney-shaped cut-outs 31, 32 which form, in use, clearances for the nuts 23, 24.

A second valve operating elemnt 33, also in the form of a lever has an enlarged portion 34 at one end which is formed on one side with a circular boss 35 and on the other side with a boss 36 of smaller diameter. A hole 37 passes centrally through both bosses and is axially aligned with the hole 27 in the element 25. A V-shaped groove 38 extends diametrically across the face of the boss 35. A bolt 39 passes through the holes 27, 37 and includes a shoulder 40 which seats in a counterbored hole 41 in the body 8. A nut 42 secures together the body 8, elements 25, 33 and the cover plate 17 so that the elements 25, 33 are free to rotate about the shank of the bolt 39.

A pair of balls 43,44, are located in the holes 28,29 and engage the element 33. The balls 43,44 also abut a face of the plate 22. A pair of springs 45,46 are located in respective extensions 47,48 of the closure members 15,16 and engage the cover plate 17. The plate 22 is thus urged into contact with the balls 43, 44.

In use, when the holes 28,29 are aligned with the groove 38 the balls 43,44 enter the groove 38. The closure members 15,16 are thereby moved by the springs 45,46 to a position so that fluid may flow between ports 11 and 12 via passage 9, and between ports 13 and 14 via passage 10. This condition will obtain for all positions of the elements 25,33 so long as the holes 28, 29 and the groove 38 remain aligned. In all other relative positions of the elements 25, 33 the balls are urged out of the groove 38 and thus actuate the closure members 15,16 against the springs 45,46 to close the ports 11, 13.

The hydrostatic transmission system shown diagrammatically in FIG. 6 comprises two pump and motor units 50,51 of a known type and each having a means in the form of a lever 52, 53 by which the output speeds at the shafts 54,55 may be controlled. The high pressure ports (not shown) the units 50,51 are interconnected by a passage 56. The low pressure ports are similarly interconnected by a passage 57. A valve 58 substantially as previously described is connected so as, in use, to open and close the passages 56, 57. The operating elements 59,60 of the valve 58 are respectively coupled by linkages 61,62 to the levers 52,53. Input shafts 63,64 of the units 50,51 are driven by a single power means (not shown).

In use the shafts 63,64 rotate at identical speeds. When the positions of the levers 52,53 are substantially identical the operating elements 59,60 are in positions relative to each other whereby the closure members (not shown) of the valve 58 permit flow through the passages 56,57. The high and low pressure ports of the unit are thus interconnected to ensure that the speeds of the shafts 54,55 are substantially identical. This condition continues to obtain so long as the position of the lever 52 corresponds to that of the lever 53.

If one of the levers 52,53 is moved relative to the other the valve 58 is operated by the linkages 61,62 to isolate the high and low pressure ports of the units 50,51 as previously described, to permit the speeds of the shafts 54,55 to be varied.

A system of the kind described has a particular application to the transmission of tracked vehicles, in which steering of the vehicle is effected by varying the relative speeds of the tracks.

Having thus described my invention what I claim as new and desire to secure by Letters Patent is:

1. A valve including a body having a pair of ports and a passage therebetween, a closure member movably mounted in the body to control fluid flow in the passage, a pair of valve operating elements mounted on the body and capable of movement relative to one another, actuating means mounted for movement with one of the said elements and engageable with a co-operating means on the other of the elements and biasing means urging the closure member towards the actuating means, the said actuating means co-acting with the closure member so that when the operating elements are in a predetermined position relative to each other the closure member is in a first position relative to the ports, irrespective of the position of the operating elements relative to the body, but in all other positions of the operating elements relative to each other the closure member is in a second position relative to the ports.

2. A valve as claimed in claim 1 in which the operating elements are mounted for rotation about a common axis.

3. A valve as claimed in claim 1 in which the closure member is in the form of a spool slidable in the passage.

4. A valve as claimed in claim 1 which includes an abutment on the closure member and in which the actuating means comprises a pair of balls engaging said abutment.

5. A valve as claimed in claim 4 in which the co-operating means on said other element compises a groove within which said balls lie when the operating elements are in said predetermined position relative to each other.

6. A valve as claimed in claim 1 which includes a plurality of pairs of ports in the body, a plurality of passages respectively connecting the ports of the respective pairs and a plurality of closure members respectively associated with the pairs of ports.

7. A valve as claimed in claim 6 which includes a plate to which the closure members are secured, said plate being urged by the biasing means to abut the actuating means.

8. A valve as claimed in claim 6 which includes two pairs of ports.

* * * * *